US012194763B2

(12) United States Patent
Kawamorita

(10) Patent No.: US 12,194,763 B2
(45) Date of Patent: Jan. 14, 2025

(54) THERMAL PRINTER AND METHOD FOR OPERATING THERMAL PRINTER

(71) Applicant: TOSHIBA TEC KABUSHIKI KAISHA, Tokyo (JP)

(72) Inventor: Yuji Kawamorita, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 252 days.

(21) Appl. No.: 17/941,188

(22) Filed: Sep. 9, 2022

(65) Prior Publication Data

US 2024/0083186 A1 Mar. 14, 2024

(51) Int. Cl.
*B41J 2/32* (2006.01)
*B41J 29/38* (2006.01)

(52) U.S. Cl.
CPC *B41J 29/38* (2013.01); *B41J 2/32* (2013.01)

(58) Field of Classification Search
CPC ............ B41J 13/12; B41J 2/365; B41J 2/325; B41J 2/315; B41J 2/32; B41J 29/38; B41J 2/36; B41J 2/362; B41J 2/355; B41F 16/00; B41F 16/0006
See application file for complete search history.

(56) References Cited

U.S. PATENT DOCUMENTS

2018/0086100 A1* 3/2018 Uematsu ................ B41J 29/387
2021/0252888 A1* 8/2021 Iwamoto .................. B26D 5/16

FOREIGN PATENT DOCUMENTS

JP 2008-6686 1/2008

* cited by examiner

*Primary Examiner* — Kristal Feggins
(74) *Attorney, Agent, or Firm* — Amin, Turocy & Watson, LLP

(57) ABSTRACT

According to one embodiment, a thermal printer includes a thermal head that is provided inside a main body and prints acquired print data on a medium, a temperature sensor that detects the temperature of the thermal head, a notification unit that notifies a user of information, and a processor. If the temperature sensor detects the temperature of a preset set value or higher during the printing of the print data by the thermal head, the processor controls the thermal head to stop the driving and controls the notification unit to notify that the thermal printer is not in an abnormal state.

17 Claims, 6 Drawing Sheets

FIG. 4

202

| STOP TEMPERATURE | RESTART TEMPERATURE |
|---|---|
| A | B |

FIG. 5

203

| PATTERN | STATUS | PRESENCE / ABSENCE OF OPERATION | DISPLAY CONTENT |
|---|---|---|---|
| W | IN OPERATION OF PRINTING | PRESENT | ERROR DISPLAY |
| X | IN OPERATION OF PRINTING | ABSENT | NUMBER OF PRINT-INSTRUCTED SHEETS, NUMBER OF PRINTED SHEETS |
| Y | IN STOPPAGE OF PRINTING | PRESENT | MESSAGE THAT IT IS NOT IN ABNORMAL STATE |
| Z | IN STOPPAGE OF PRINTING | ABSENT | NUMBER OF PRINT-INSTRUCTED SHEETS, NUMBER OF PRINTED SHEETS |

THERMAL PRINTER AND METHOD FOR OPERATING THERMAL PRINTER

FIELD

Embodiments described herein relate generally to a thermal printer and a method for operating a thermal printer.

BACKGROUND

Thermal printers that perform printing on media such as paper are used in a wide range of fields. For example, there is a thermal printer that prints a barcode or product information on a label attached to a product.

The thermal printer drives a plurality of heat-generating elements included in a thermal head and performs printing by using thermal energy. For this reason, if the thermal printer performs printing continuously, the temperature of the thermal head rises. In a thermal printer of the related art, to protect the thermal head, if the temperature of the thermal head is a predetermined value or more, printing is stopped and further temperature rise is prevented.

In the above-mentioned thermal printer of the related art, there is a case where a user may not understand that printing has been stopped to protect the thermal head. In this case, the user may open a main body of the thermal printer to check for failure. If the main body is opened, the thermal head in a high-temperature state is exposed. For this reason, the thermal printer of the related art has problems in terms of safety.

The thermal printer that can realize protection of the thermal head and ensure safety is desired from this background.

DESCRIPTION OF THE DRAWINGS

FIG. 4 is a diagram illustrating a data structure of a temperature setting value table stored in a storage unit;

FIG. 5 is a diagram illustrating a data structure of a display content management table stored in the storage unit;

DETAILED DESCRIPTION

In general, according to one embodiment, a thermal printer includes a thermal head that is provided inside a main body and prints acquired print data on a medium, a temperature sensor that detects the temperature of the thermal head, a notification unit that notifies a user of information, and a processor, wherein, if the temperature sensor detects the temperature of a preset set value or higher during the printing of the print data by the thermal head, the processor controls the thermal head to stop the driving and controls the notification unit to notify that the thermal printer is not in an abnormal state.

Figure 1:
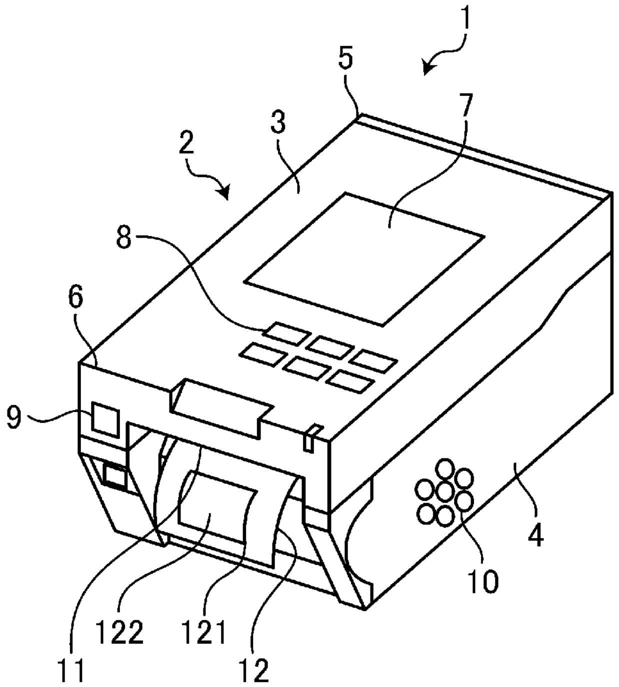
FIG. 1 is a perspective view illustrating an outer appearance of a thermal printer according to an embodiment.

Hereinafter, a printer according to the embodiment will be described with reference to the drawings. FIG. 1 is a perspective view illustrating the outer appearance of a thermal printer 1. The thermal printer 1 is communicably connected to an external device (not illustrated) by wire or wirelessly. In the present embodiment, the external device is a personal computer (PC) 50 (see FIG. 6). The thermal printer 1 performs printing on a label based on print data acquired from the PC 50. However, this is an example of a method of using the thermal printer 1, and the thermal printer 1 may be a printer used in other fields.

The thermal printer 1 has a main body 2. The main body 2 includes an upper housing 3 and a lower housing 4. The upper housing 3 is supported by the lower housing 4 rotatably about a rear end side 5 as a shaft. The upper housing 3 can be locked in a state where a front-end side 6 is in contact with the lower housing 4. FIG. 1 illustrates a state in which the upper housing 3 and the lower housing 4 are locked. If the lock between the upper housing 3 and the lower housing 4 is released from the state illustrated in FIG. 1 and the front end side 6 of the upper housing 3 is rotated, the inside of the main body 2 is opened.

A display 7 is provided on an upper surface of the upper housing 3. The display 7 is configured with the liquid crystal display or the like. The display 7 displays various types of information. For example, the display 7 displays a message indicating that the printing operation of the thermal printer 1 is stopped. The display 7 is an example of a notification unit. Further, an input operation unit 8 is provided on the upper surface of the upper housing 3. The input operation unit 8 includes a plurality of buttons. The buttons are a button for turning on or off the power, a button for interrupting the printing operation, a button for switching the display of the display 7, and the like. The input operation unit 8 inputs various types of information to a control unit 100 (see FIG. 3) by a user operating these various buttons.

The operation unit 9 is provided on the front end side 6 of the upper housing 3. The operation unit 9 releases the lock between the upper housing 3 and the lower housing 4. The operation unit 9 is an example of an operation unit that opens the inside of the main body 2. The operation unit 9 may have only the function of releasing the lock between the upper housing 3 and the lower housing 4 or may have the function of rotating the upper housing 3 by driving the motor or the like after releasing the lock.

A sound output port 10 is formed in the lower housing 4. The sound output port 10 discharges the sound output by a speaker 43 (see FIG. 3) built in the main body 2 to the outside of the main body 2. Further, the main body 2 includes a dispensing port 11. The dispensing port 11 is formed by the upper housing 3 and the lower housing 4. The dispensing port 11 discharges a printed label paper 12 from the inside of the main body 2 to the outside. The label paper 12 is configured with a mount 121 and a plurality of labels 122 attached to the surface of the mount 121 at predetermined intervals. The label 122 is an example of the medium on which the thermal printer 1 performs printing.

Figure 2:
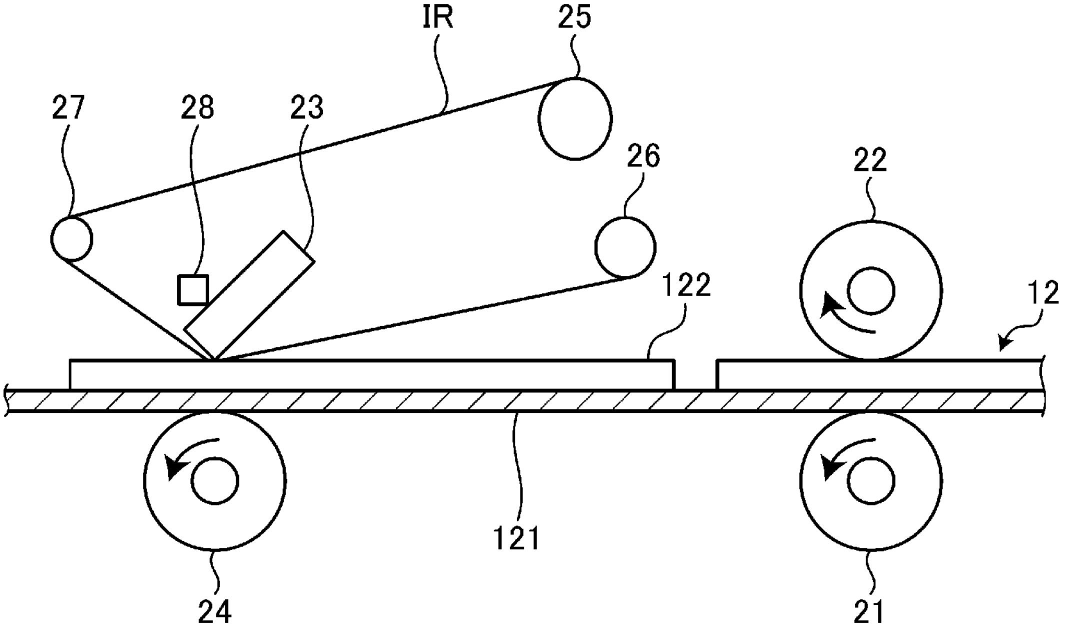
FIG. 2 is a diagram schematically illustrating an internal configuration of the thermal printer.

FIG. 2 is a diagram schematically illustrating an internal structure of the thermal printer 1. As illustrated in FIG. 2, the thermal printer 1 includes a conveying roller 21, a driven roller 22, a thermal head 23, a platen roller 24, an ink ribbon holding portion 25, an ink ribbon winding portion 26, a guide roller 27, a temperature sensor 28, and the like. The thermal printer 1 in the present embodiment is a label printer used for printing the label 122.

The conveying roller 21 is driven by the conveyor motor 31 (see FIG. 3) configured with a stepping motor. The driven roller 22 is provided to face the conveying roller 21. The driven roller 22 together with the conveying roller 21 interposes the label paper 12 and rotates to convey the label paper 12. The conveying roller 21, the driven roller 22, the conveyor motor 31, and the like constitute a conveying unit that conveys the medium.

The thermal head 23 is attached to the upper housing 3. The thermal head 23 is provided to extend in a width direction intersecting a paper conveying direction by the conveying unit, that is, in a direction perpendicular to a paper surface in FIG. 2. The thermal head 23 is a line thermal head including a plurality of heat generating elements along the width direction. The thermal head 23 performs printing on the label 122 on the label paper 12 by generating heat from the heat generating element and melting the ink contained in an ink ribbon IR. In the following description, generating heat from the heat generating element of the thermal head 23 is also referred to as "driving the thermal head 23".

The thermal head 23 is located at a printing position where pressure is applied to the platen roller 24 in a state where the upper housing 3 is locked to the lower housing 4. That is, the thermal head 23 is located at the printing position in a state where the inside of the main body 2 is closed. The thermal head 23 is located at a non-printing position away from the platen roller 24 in a state where the front end side 6 of the upper housing 3 is separated from the lower housing 4. That is, the thermal head 23 is located at the non-printing position in a case where the inside of the main body 2 is opened. If the thermal head 23 is located at the non-printing position, the thermal head 23 is in the exposed state. The user can detach and attach the label paper 12, the ink ribbon IR, and the like by locating the thermal head 23 at the non-printing position.

The platen roller 24 is attached to the lower housing 4. The platen roller 24 is driven by the conveyor motor 31. The ink ribbon holding portion 25 winds the unused ink ribbon IR in a roll shape. The ink ribbon winding unit 26 is rotated by the winding motor (not illustrated) to wind the ink ribbon IR. The guide roller 27 guides the ink ribbon IR wound by the ink ribbon winding unit 26. The temperature sensor 28 is attached to the thermal head 23. The temperature sensor 28 detects the temperature of the thermal head 23.

Figure 3:
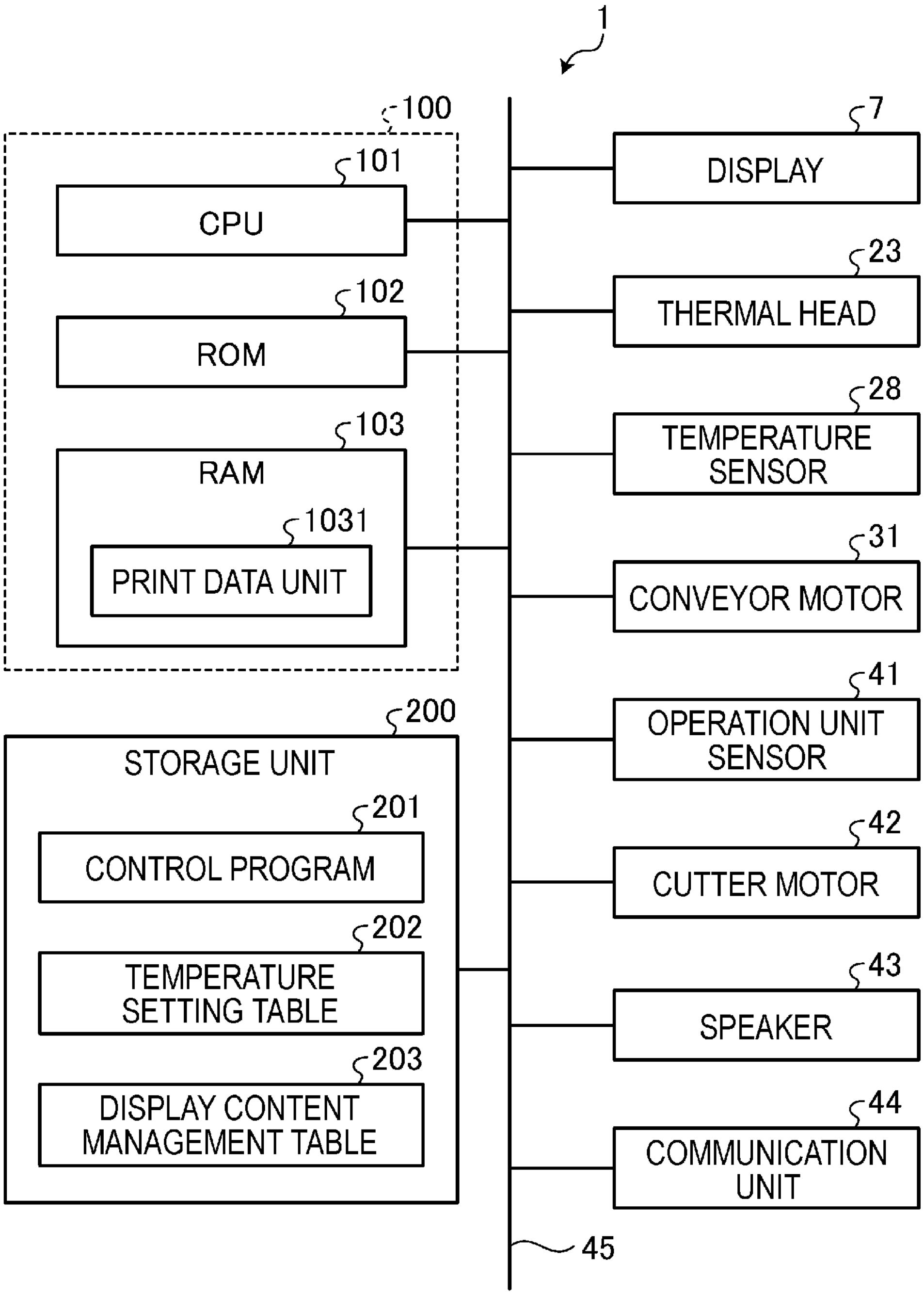
FIG. 3 is a block diagram illustrating a main hardware configuration of the thermal printer.

FIG. 3 is a block diagram illustrating a main hardware configuration of the thermal printer 1. The thermal printer 1 includes the control unit 100, a storage unit 200, a display 7, the thermal head 23, the temperature sensor 28, the conveyor motor 31, an operation unit sensor 41, a cutter motor 42, a speaker 43, and a communication unit 44. The control unit 100, the storage unit 200, the display 7, the thermal head 23, the temperature sensor 28, the conveyor motor 31, the operation unit sensor 41, the cutter motor 42, the speaker 43, and the communication unit 44 are connected to each other via a bus 45.

The control unit 100 includes a central processing unit (CPU) 101, a read only memory (ROM) 102, and a random access memory (RAM) 103. The CPU 101, the ROM 102, and the RAM 103 are connected to each other via the bus 45.

The CPU 101 controls the overall operations of the thermal printer 1. The CPU 101 is an example of a processor. The ROM 102 stores various programs such as a program used to drive the CPU 101 and various data. The RAM 103 is used as a work area of the CPU 101 and loads various programs and various data stored in the ROM 102 and the storage unit 200. The CPU 101 executes various control processes of the thermal printer 1 by performing operations according to the control program stored in the ROM 102 or the storage unit 200 and loaded in the RAM 103.

Further, the RAM 103 includes a print data unit 1031. The print data unit 1031 stores the print data, the number of print instructions, and the like received from the external device such as the PC 50. The print data is character data, image data, or the like to be printed on the label paper 12. The number of print-instructed sheets is the number of labels 122 on which print data is to be printed.

The storage unit 200 is configured with a storage medium such as a hard disk drive (HDD) or a flash memory and maintains stored contents even if power is turned off. The storage unit 200 stores a control program 201, a temperature setting table 202, and a display content management table 203.

The control program 201 is a program for realizing a function of acquiring the print data from the external device such as the PC 50, a function of driving the thermal head 23 to print the print data on the medium, a function of controlling the thermal head 23 based on an output of the temperature sensor 28, a function of displaying various types of information on the display 7, and the like. The control program 201 includes various other control programs operating the thermal printer 1.

The temperature setting table 202 is a table that stores the set temperature for controlling the thermal head 23. The temperature setting table 202 can be arbitrarily set according to the specifications and the like of the thermal head 23 used in the thermal printer 1. FIG. 4 is a diagram illustrating a data structure of the temperature setting table 202. The temperature setting table 202 stores stop temperature A and restart temperature B.

The stop temperature A is a temperature set for stopping the driving of the thermal head 23. The stop temperature A is set to a temperature at which there is a concern that other components of the thermal head 23 and the thermal printer 1 may be damaged if the thermal head 23 is continuously driven in a state where the stop temperature A is exceeded. For example, the stop temperature A is set to 80° C. The stop temperature A is an example of a preset set value The restart temperature B is a temperature set for restarting the driving of the thermal head 23 of which driving was stopped. In order to prevent the temperature of the thermal head 23 from reaching the stop temperature A after restarting the driving of the thermal head 23, the restart temperature B is set to a value lower than the stop temperature A by, for example, about 10° C.

If the thermal printer 1 continuously executes printing, and thus, the temperature of the thermal head 23 reaches the stop temperature A, the driving of the thermal head 23 and the conveyor motor 31 is stopped to stop the printing operation. After that, if the thermal head 23 is cooled down and the temperature of the thermal head 23 drops to the restart temperature B, the thermal printer 1 drives the thermal head 23 and the conveyor motor 31 to restart the printing operation.

In the present specification, the period during which the thermal printer 1 prints the print data acquired from the PC 50 by the number of print-instructed sheets instructed by the PC 50 is referred to as an operation period. Herein, the number of sheets is the number of labels 122 on which print data is printed. The period during which the thermal head 23 and the conveyor motor 31 are driven to perform printing on the label 122 is referred to as a printing operation period.

The period during which the driving of the thermal head 23 and the conveyor motor 31 is stopped during the operation period of the thermal printer 1 is referred to as a printing stop period. That is, in the present embodiment, the period from when the temperature of the thermal head 23 reaches the stop temperature A to when the temperature of the thermal head 23 reaches the restart temperature B is the printing stop period. Further, the operation during the operation period not including the printing stop period is referred to as continuous operation, and the operation during the operation period including the printing stop period is referred to as intermittent operation.

The printing stop period may not be set from when the temperature of the thermal head 23 reaches the stop temperature A to when the temperature of the thermal head 23 reaches the restart temperature B. For example, after the temperature of the thermal head 23 reaches the stop temperature A, the predetermined period may be set as the printing stop period. Further, the thermal printer 1 may be in an operation mode in which the thermal head 23 is repeatedly driven and stopped at predetermined time intervals after the temperature of the thermal head 23 reaches the stop temperature A. In either case, the printing stop period will be included in the operation period. The thermal printer 1 can protect the thermal head 23, the main body 2, and the like from heat by setting the printing stop period.

The display content management table 203 is a table that manages the content to be displayed on the display 7. FIG. 5 is a diagram illustrating a data structure of the display content management table 203. The display content management table 203 stores the status, the presence or absence of operation, and the display content in association with a pattern.

The pattern is information that identifies a display pattern. The status indicates the operation status of the thermal printer 1. The operation status is information indicating whether the status is in the operation of printing or in the stoppage of printing. The presence or absence of the operation is information indicating the presence or absence of operation of the operation unit 9. The display content is information indicating the content to be displayed on the display 7.

If the status is in the operation of printing and the operation unit 9 is operated, the display 7 displays error information (pattern W). The error information is, for example, a message prompting to lock the upper housing 3 and the lower housing 4. If the main body 2 is opened during a normal operation of the thermal printer 1, the display 7 displays the error information.

If the status is in the operation of printing and the operation unit 9 is not operated, the display 7 displays the number of print-instructed sheets and the number of printed sheets (pattern X). If the thermal printer 1 is in normal operation and the main body 2 is not opened, the display 7 displays the number of print-instructed sheets and the number of printed sheets.

If the status is in the stoppage of printing and the operation unit 9 is operated, the display 7 displays the message indicating that the thermal printer 1 is not in the abnormal state (pattern Y). If it is assumed that the main body 2 is opened without an understandable reason why the status is in the stoppage of printing, the display 7 displays the message indicating that the thermal printer 1 is not in the abnormal state.

The message indicating that the thermal printer 1 is not in the abnormal state may be the message indicating that the thermal printer is in intermittent operation. The message indicating that the thermal printer 1 is not in the abnormal state may be any content that can directly or indirectly notify the user that the thermal printer 1 is not in the abnormal state. In addition to the above message, the display 7 may display the message notifying that the thermal head 23 is in a high-temperature state.

If the status is in the stoppage of printing and the operation unit 9 is not operated, the display 7 displays the number of print-instructed sheets and the number of printed sheets (Pattern Z). If it is assumed that the user understands the reason why the status is in the stoppage of printing, the display 7 maintains the display of the number of print-instructed sheets and the number of printed sheets.

The display content may be determined only according to the status. That is, the display content may be determined according to whether the status is in the operation of printing or in the stoppage of printing. In this case, if the status is in the operation of printing, it is desirable that the display 7 displays the number of print-instructed sheets and the number of printed sheets. Further, if the status is in the stoppage of printing, it is desirable that the display 7 displays the message indicating that the thermal printer 1 is not in the abnormal state.

Referring back to FIG. 3, the description of the hardware configuration of the thermal printer 1 will be continued. The description of the display 7, the thermal head 23, the temperature sensor 28, and the conveyor motor 31 is the same as described above. For this reason, the duplicate description will be omitted.

The operation unit sensor 41 is a sensor that detects that the operation unit 9 was operated or is expected to be operated by the user (hereinafter, also referred to as the operation on the operation unit 9). The operation unit sensor 41 is configured with a touch sensor provided on the surface of the operation unit 9, a switch detecting that the operation unit 9 is pressed, and the like. If the operation unit sensor 41 detects the operation on the operation unit 9 by the user, the operation unit sensor 41 inputs a detection signal to the control unit 100.

The cutter motor 42 is a motor that drives a cutter (not illustrated). The cutter is formed by combining a flat plate-shaped fixed blade and a movable blade. The cutter cuts the label paper 12 discharged from the dispensing port 11 by sliding the movable blade with respect to the fixed blade. Specifically, the cutter cuts the mount 121 to which the printed label 122 is attached. The cutter motor 42 drives the movable blade of the cutter.

The speaker 43 generates a sound under the control of the control unit 100. For example, if the printing operation is stopped based on the temperature detected by the temperature sensor 28, the speaker 43 outputs a sound of the message indicating that the thermal printer 1 is not in the abnormal state. The speaker 43 is an example of the notification unit.

The communication unit 44 is an interface for communicating with an external device such as the PC 50. The control unit 100 can transmit and receive information (data) to and from the external device by being connected to the external device via the communication unit 44.

Figure 6:
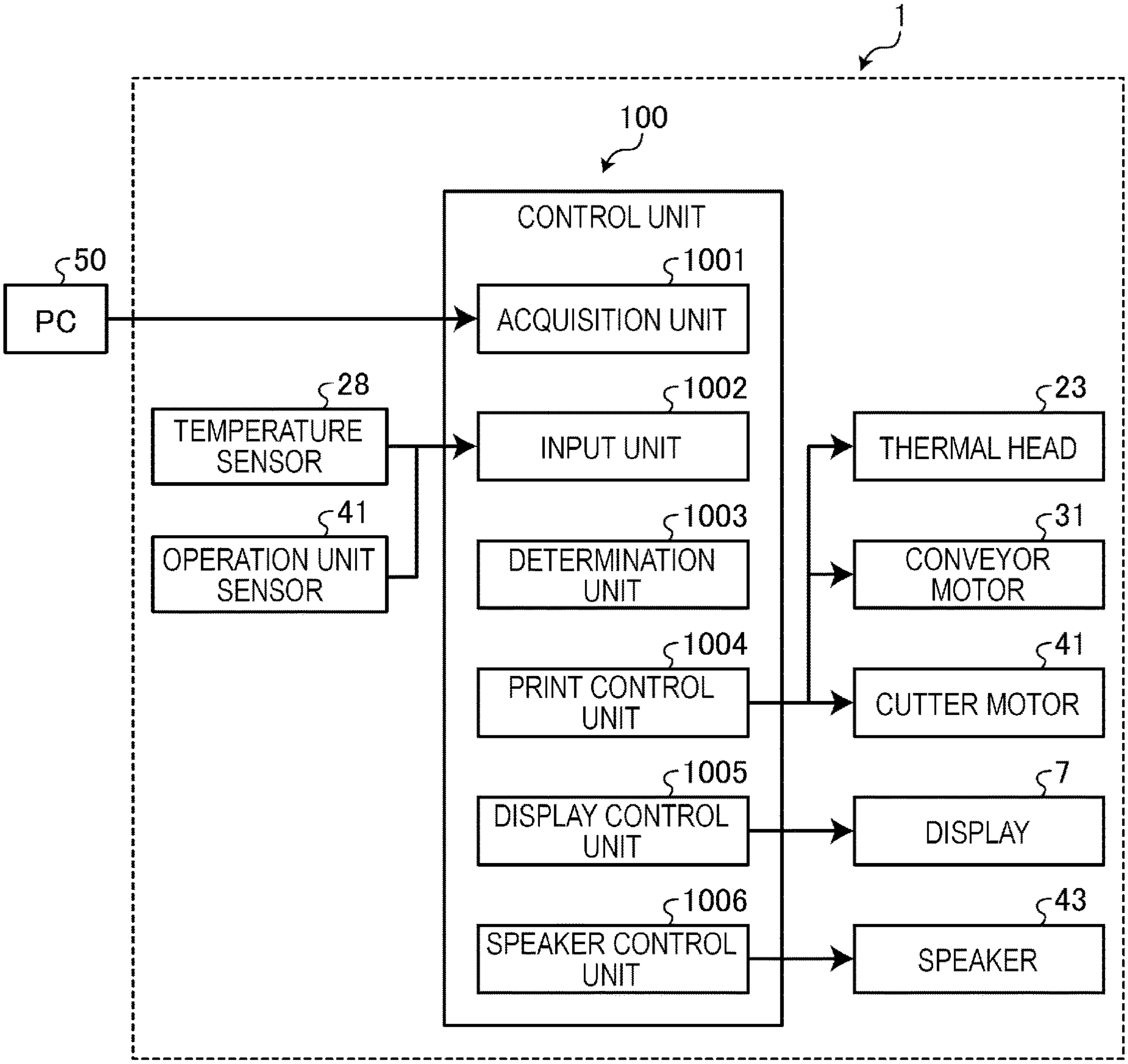
FIG. 6 is a block diagram illustrating a main functional configuration of the control unit.

Next, a functional configuration of the thermal printer 1 will be described. FIG. 6 is a block diagram illustrating the main functional configuration of the thermal printer 1. The control unit 100 operates according to the control program stored in the ROM 102 or the storage unit 200 to function as an acquisition unit 1001, an input unit 1002, a determination unit 1003, a print control unit 1004, a display control unit 1005, and a speaker control unit 1006. In other words, the function of each functional unit described above is implemented by the operation of the CPU 101. Each of these functions may be configured by hardware such as a dedicated circuit.

The acquisition unit 1001 acquires the print data. Specifically, the acquisition unit 1001 receives the print data such as character data and image data to be printed on the label 122 from the PC 50. Further, the acquisition unit 1001 receives the number of print-instructed sheets associated with the print data from the PC 50. The acquisition unit 1001 stores the acquired print data and the number of print-instructed sheets in the print data unit 1031.

Various types of sensor information are input to the input unit 1002. Specifically, the temperature information of the thermal head 23 is input from the temperature sensor 28 to the input unit 1002. Further, the detection signal is input from the operation unit sensor 41 to the input unit 1002.

The determination unit 1003 determines whether or not the temperature of the thermal head 23 is the stop temperature A or higher based on the temperature information input to the input unit 1002. Further, the determination unit 1003 determines whether or not the temperature of the thermal head 23 is the restart temperature B or lower based on the temperature information input to the input unit 1002.

The print control unit 1004 controls the print unit including the thermal head 23, the conveyor motor 31, the cutter motor 42, and the like to print the print data on the label 122. Specifically, the print control unit 1004 controls the conveyor motor 31 to convey the label 122 to the print position. Next, the print control unit 1004 controls the thermal head 23 and the conveyor motor 31 to print the print data on the label 122 while conveying the label paper 12. Subsequently, the print control unit 1004 controls the conveyor motor 31 to dispense the printed label 122 from the dispensing port 11. Next, the print control unit 1004 drives the cutter motor 42 to cut the mount 121.

Further, the print control unit 1004 controls the thermal head 23 and the conveyor motor 31 based on a determination result of the determination unit 1003. Specifically, if the determination unit 1003 determines that the temperature of the thermal head 23 is the stop temperature A or higher in the operation of the printing, the print control unit 1004 stops the driving of the thermal head 23 and the conveyor motor 31. If the determination unit 1003 determines that the temperature of the thermal head 23 is the restart temperature B or lower in the stoppage of printing, the print control unit 1004 restarts the driving of the thermal head 23 and the conveyor motor 31.

The display control unit 1005 controls the display 7 to display various types of information. For example, if the acquisition unit 1001 did not acquire the print data, the display control unit 1005 allows the display 7 to display a message indicating that the display 7 is in a standby state. If the thermal printer 1 is in the operation of printing and the operation unit 9 is not operated, the display control unit 1005 allows the display 7 to display the number of print-instructed sheets and the number of printed sheets. If the thermal printer 1 is in the operation of printing and the operation unit 9 is operated, the display control unit 1005 allows the display 7 to display error information.

If the thermal printer 1 is in the stoppage of printing and the operation unit 9 is operated, the display control unit 1005 allows the display 7 to display the message indicating that the thermal printer 1 is not in the abnormal state. The message indicating that the thermal printer 1 is not in the abnormal state may be a message indicating that the thermal printer 1 is in intermittent operation. The display 7 can inform the user that the thermal printer 1 is not out of order by displaying the above message. Further, the display 7 can indirectly inform the user that the thermal head 23 is in a high-temperature state by displaying the above message.

If the thermal printer 1 is in the stoppage of printing and the operation unit 9 is not operated, the display control unit 1005 maintains a state where the display 7 is allowed to display the number of print-instructed sheets and the number of printed sheets. If the thermal printer 1 is in the stoppage of printing and the operation unit 9 is not operated, the display control unit 1005 may allow the display 7 to display the message indicating that the thermal printer 1 is not in the abnormal state.

The speaker control unit 1006 controls the speaker 43 to output various types of sound information. For example, if the thermal printer 1 is in the stoppage of printing and the operation unit 9 is operated, the speaker control unit 1006 outputs a sound message indicating that the thermal printer 1 is not in the abnormal state.

Figure 7:
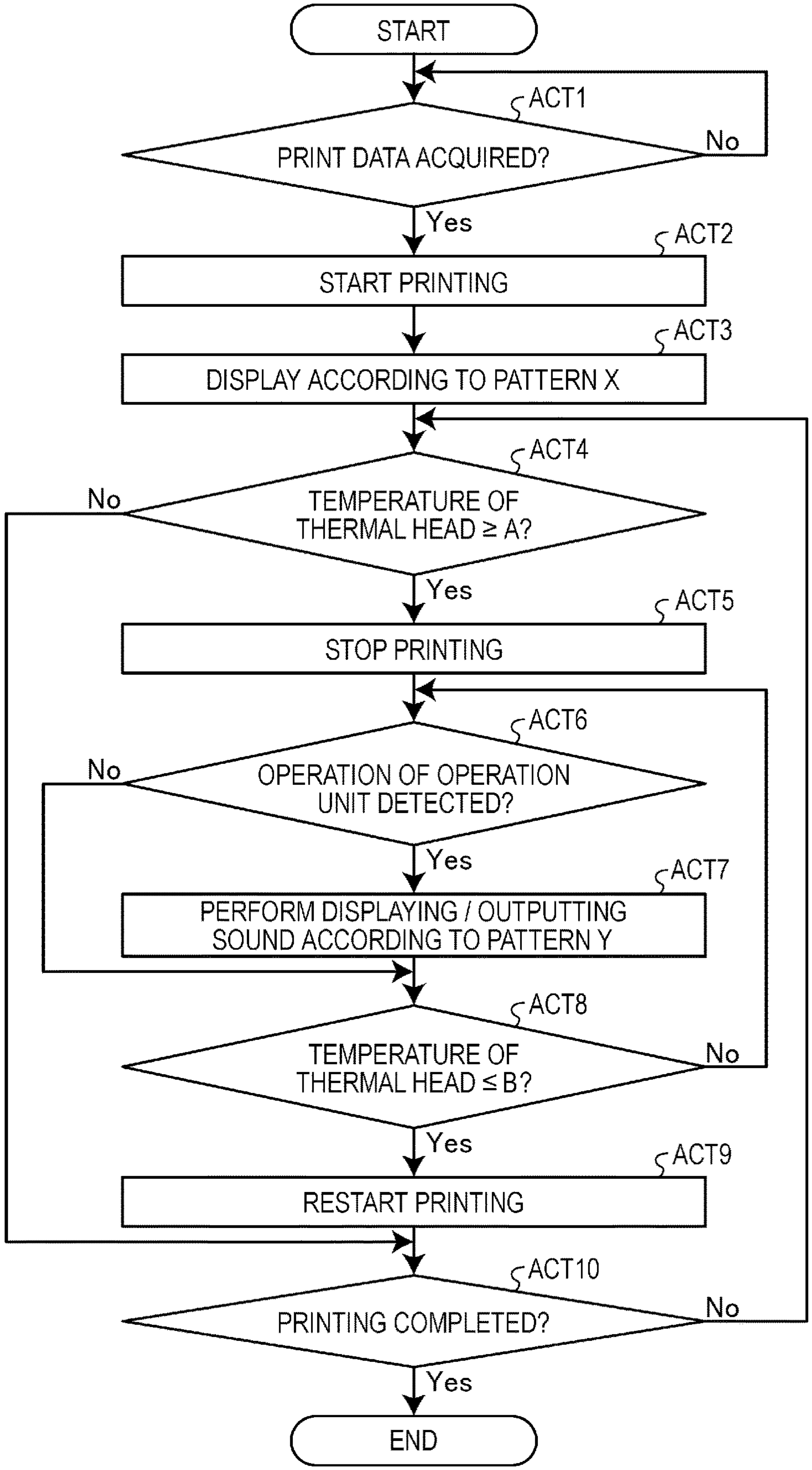
FIG. 7 is a flowchart illustrating a flow of a printing process by the control unit.

Next, a printing process executed by the control unit 100 of the thermal printer 1 will be described. FIG. 7 is a flowchart illustrating a flow of the printing process executed by the control unit 100.

The control unit 100 determines whether or not the acquisition unit 1001 acquired the print data from the PC 50 together with the number of print-instructed sheets (ACT 1), and if the acquisition unit 1001 did not acquire the print data (N in ACT 1), the process returns to the process of ACT 1 and waits. If the acquisition unit 1001 acquired the print data (Y in ACT 1), the print control unit 1004 drives the thermal head 23 and the conveyor motor 31 to start the printing operation (ACT 2).

It is assumed that the thermal printer 1 does not perform the printing operation until the acquisition unit 1001 acquires the print data. Therefore, in the present embodiment, if the acquisition unit 1001 acquires the print data, the print control unit 1004 estimates that the temperature of the thermal head 23 is lower than the stop temperature A. Then, the print control unit 1004 starts the printing operation. Before the start of the printing operation in ACT 2, the thermal printer 1 may allow the determination unit 1003 to determine whether or not the temperature of the thermal head 23 is lower than the stop temperature A.

The display control unit 1005 performs the display according to the pattern X (ACT 3). At this time, it is assumed that the operation of the operation unit 9 is not detected. Specifically, the display control unit 1005 allows the display 7 to display the number of print-instructed sheets acquired by the acquisition unit 1001 and the number of printed labels 122 printed by the thermal head 23. At the time of print start, the number of printed sheets is 0. If the operation of the operation unit 9 is detected in this state, the display control unit 1005 displays the pattern W.

Figure 8:
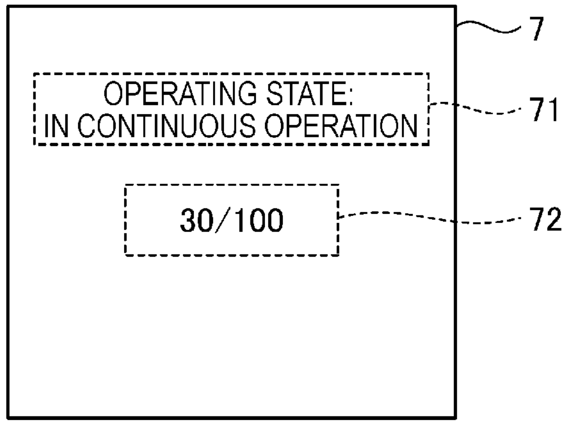
FIG. 8 is a diagram illustrating an example of a display mode by a display unit.

FIG. 8 is a diagram illustrating a display example of the display 7 in a state where the operation of the operation unit 9 is not detected during the printing operation. The display 7 displays the first display unit 71 and the second display unit 72. The first display unit 71 shows the operating state of the thermal printer 1. In the example of FIG. 8, the character string "in continuous operation" is displayed on the first display unit 71. This indicates that, after the printing of the print data is started, the printing operation is continuously performed. The user can recognize that the thermal printer 1 is operating normally by looking at the display of "in continuous operation" on the first display unit 71.

The second display unit 72 shows the number of print-instructed sheets and the number of printed sheets. The number of print-instructed sheets is the number of labels 122 to be printed, which the acquisition unit 1001 acquired from the PC 50 together with the print data. The number of printed sheets is the number of labels 122 printed by the thermal head 23 during the printing of the print data. The second display unit 72 performs displaying in the format of "number of printed sheets/number of print-instructed sheets". In the example of FIG. 8, the second display unit 72 indicates that the number of print-instructed sheets is 100, of which printing of 30 sheets has been completed.

Referring back to FIG. 7, the printing process by the control unit 100 will be described. The temperature of the thermal head 23 rises as the printing is repeated. During the printing operation, the temperature information is input to the input unit 1002 from the temperature sensor 28. The determination unit 1003 compares the temperature indicated by the temperature information input to the input unit 1002 with the stop temperature A. Then, the determination unit 1003 determines whether or not the temperature of the thermal head 23 is the stop temperature A or higher (ACT 4).

If the determination unit 1003 determines that the temperature of the thermal head 23 is the stop temperature A or higher (Y in ACT 4), the print control unit 1004 stops the printing operation (ACT 5). Specifically, the print control unit 1004 stops driving the thermal head 23 and the conveyor motor 31. Next, the determination unit 1003 determines whether or not the operation of the operation unit 9 was detected (ACT 6). Specifically, the determination unit 1003 determines whether or not an operation signal was input from the operation unit sensor 41 to the input unit 1002.

If the determination unit 1003 determines that an operation of the operation unit 9 was detected (Y in ACT 6), the display control unit 1005 performs displaying according to the pattern Y, and the speaker control unit 1006 outputs a sound from the speaker 43 (ACT 7). Specifically, the display control unit 1005 allows the display 7 to display the message indicating that the thermal printer 1 is not in an abnormal state. Further, the speaker control unit 1006 allows the speaker 43 to sound-output the message indicating that the thermal printer 1 is not in the abnormal state.

Figure 9:
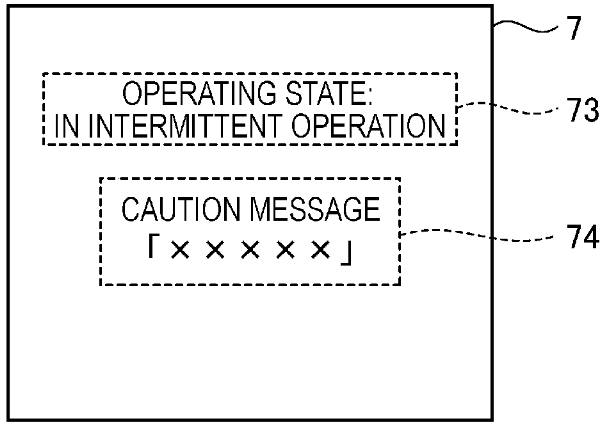
FIG. 9 is a diagram illustrating another example of the display mode by the display unit.

FIG. 9 is a diagram illustrating a display example of the display 7 in a state where an operation of the operation unit 9 is detected in the stoppage of printing. The display 7 displays the third display unit 73 and the fourth display unit 74. The third display unit 73 shows the operating state of the thermal printer 1. In the example of FIG. 9, the character string "in intermittent operation" is displayed on the third display unit 73. This indicates that the printing operation is stopped in the normal state while printing of the print data is being executed. In other words, the character string "in intermittent operation" indicates that the thermal printer 1 is not in an abnormal state. The user can recognize that the thermal printer 1 is operating normally by looking at the display of "in intermittent operation" on the third display unit 73.

The fourth display unit 74 displays a caution message. The caution message is, for example, a message indicating that the thermal head 23 is in a high-temperature state. The caution message may be a message prompting attention not to open the main body 2.

Referring back to FIG. 7, the printing process by the control unit 100 will be described. If the thermal printer 1 is in the stoppage of printing, the determination unit 1003 determines whether or not the temperature of the thermal head 23 is the restart temperature B or lower (ACT 8). If the determination unit 1003 determines that the temperature of the thermal head 23 is the restart temperature B or lower (Y in ACT 8), the print control unit 1004 restarts the printing operation (ACT 9). Specifically, the print control unit 1004 restarts the driving of the thermal head 23 and the conveyor motor 31.

Next, the control unit 100 determines whether or not the printing of the print data is completed (ACT 10). If the printing of the print data is completed (Y in ACT 10), the control unit 100 ends the printing process.

If the temperature of the thermal head 23 is lower than the stop temperature A in the process of ACT 4 (N in ACT 4), the control unit 100 proceeds to the process of ACT 10. If an operation of the operation unit 9 is not detected in the process of ACT 6 (N in ACT 6), the control unit 100 skips the process of ACT 7 and proceeds to the process of ACT 8. At this time, the display control unit 1005 performs displaying according to the pattern Z.

If the temperature of the thermal head 23 exceeds the restart temperature B in the process of ACT 8 (N in ACT 8), the control unit 100 returns to the process of ACT 6. If the printing of the print data is not completed in the process of ACT 10 (N in ACT 10), the control unit 100 returns to the process of ACT 4.

As described above, the thermal printer 1 according to the embodiment includes the thermal head 23 that is provided inside the main body 2 and prints the acquired print data on the medium, the temperature sensor 28 that detects the temperature of the thermal head 23, the display 7 that notifies the user of information, and the CPU 101, wherein if the temperature sensor 28 detects the temperature of the preset set value or higher during printing of the print data by the thermal head 23, the CPU 101 controls the thermal head 23 to stop driving and controls the display 7 to notify that the thermal printer 1 is not in an abnormal state.

Accordingly, the thermal printer 1 can protect the thermal head 23, the main body 2, and the like from damage due to high temperature. Further, if the thermal head 23 reaches the set temperature or higher and the driving is stopped, the thermal printer 1 can notify the user that the thermal printer 1 is not in an abnormal state. Therefore, the user can be prevented from inadvertently touching the high temperature thermal head 23. Accordingly, the safety of the thermal printer 1 is improved.

Further, in the thermal printer 1 according to the embodiment, the CPU 101 controls the display 7 to display information on the print data during the printing of the print data by the thermal head 23 and display information indicating that the thermal printer 1 is not in the abnormal state by switching the displaying if the temperature sensor 28 detects the temperature of the stop temperature A or higher.

Accordingly, the thermal printer 1 can notify that the thermal printer 1 is not in an abnormal state by using the display 7 which displays the information on the print data. Therefore, it is not necessary to separately provide the display notifying that the thermal printer 1 is not in an abnormal state, and the configuration of the thermal printer 1 can be simplified.

Further, the thermal printer 1 according to the embodiment further includes the operation unit 9 that opens the inside of the main body 2, and the operation unit sensor 41 that detects the operation of the operation unit 9, and the CPU 101 controls the display 7 to display information indicating that the thermal printer 1 is not in the abnormal state under the condition that the operation unit sensor 41 detects the operation of the operation unit 9.

Accordingly, only in a situation considered to be necessary, the thermal printer 1 allows the display 7 to display information indicating that the thermal printer 1 is not in an abnormal state. Therefore, in a situation considered not to be necessary, information on print data, which is useful information for the user, can be displayed on the display 7. Accordingly, the convenience for the user can be prevented from being impaired. Herein, the situation considered to be necessary is a situation in which there is a high possibility that the user opens the main body 2 to expose the thermal head 23 in a high-temperature state.

Further, in the thermal printer 1 of the embodiment, the CPU 101 controls the display 7 to display the number of media to be printed by the print data and the number of media whose printing was completed as information on the print data.

Accordingly, the thermal printer 1 can improve the convenience of the user.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A thermal printer, comprising:

a thermal head provided inside a main body that prints acquired print data on a medium;

a temperature sensor that detects a temperature of the thermal head;

a display that notifies a user of information;

an operation component that opens an inside of the main body;

an operation component sensor that detects an operation of the operation component; and a processor configured to, if the temperature sensor detects the temperature of the thermal head is a preset set value or higher during printing of the print data by the thermal head and the operation component sensor detects the operation of the operation component, stop driving the thermal head, and cause the display to notify that the thermal printer is stopped in a normal state while printing and a caution message that prompting not to open the main body.

2. The thermal printer according to claim 1, wherein the display is provided on an outer surface of the main body.

3. The thermal printer according to claim 1, wherein the processor further causes the display to display information on the print data during printing of the print data by the thermal head.

4. The thermal printer according to claim 1, wherein the processor further causes the display to display a number of media to be printed by the print data and a number of media whose printing was completed as information on the print data.

5. The thermal printer according to claim 1, wherein the thermal head is a line thermal head including a plurality of heat generating elements along a width direction.

6. The thermal printer according to claim 1, wherein driving the thermal head comprises generating heat from a heat generating element of the thermal head.

7. A method for operating a thermal printer including a thermal head that prints print data on a medium, a temperature sensor that detects a temperature of the thermal head, a display that notifies a user of information, an operation component that opens an inside of a main body, and an operation component sensor that detects an operation of the operation component, comprising:

acquiring the print data;

printing the print data acquired on the medium by the thermal head;

stopping driving of the thermal head during the printing of the print data by the thermal head if the temperature sensor detects the temperature of a preset set value or higher; and notifying information indicating that the thermal printer is stopped in a normal state while printing and a caution message that prompting not to open the main body if the operation component sensor detects the operation of the operation component.

8. The method according to claim 7, further comprising:

allowing the display, acting as a notification component, to display information on the print data during the printing of the print data.

9. The method according to claim 7, wherein a number of media to be printed by the print data and a number of media whose printing was completed are displayed as information on the print data.

10. The method according to claim 7, wherein printing comprises driving a plurality of heat generating elements along a width direction of the thermal head.

11. The method according to claim 7, wherein driving the thermal head comprises generating heat from a heat generating element of the thermal head.

12. A thermal printer driving control system, comprising:

a processor configured to, if a temperature sensor detects a temperature of a thermal head is a preset set value or higher during printing of print data by the thermal head and an operation component sensor detects an operation of an operation component that opens an inside of a main body, stop driving the thermal head, and cause a notification component to notify a user that a thermal printer is stopped in a normal state while printing and prompting not to open the main body.

13. The thermal printer driving control system according to claim 12, wherein the notification component is a display.

14. The thermal printer driving control system according to claim 13, wherein the processor further causes the display to display information on the print data during printing of the print data by the thermal head.

15. The thermal printer driving control system according to claim 13, wherein the processor further causes the display to display a number of media to be printed by the print data and a number of media whose printing was completed as information on the print data.

16. The thermal printer driving control system according to claim 12, wherein the thermal head is a line thermal head including a plurality of heat generating elements along a width direction.

17. The thermal printer driving control system according to claim 12, wherein driving the thermal head comprises generating heat from a heat generating element of the thermal head.

* * * * *